United States Patent  [15] 3,690,318
Gorsuch  [45] Sept. 12, 1972

[54] APPARATUS FOR PARENTERAL FLUID INFUSION PROVIDED WITH VARIABLE FLOW CONTROL MEANS

[72] Inventor: Reynolds G. Gorsuch, Thousand Oaks, Calif.

[73] Assignee: Bourns, Inc., Riverside, Calif.

[22] Filed: April 16, 1970

[21] Appl. No.: 28,995

[52] U.S. Cl. ......... 128/214 E, 128/DIG. 12, 222/25, 222/71, 222/158, 222/545
[51] Int. Cl. ............................................. A61m 05/14
[58] Field of Search ...128/213, 214 R, 214 C, 214 E, 128/214 F, 214.2, 227, DIG. 12; 222/25, 71, 74, 154, 158, 545; 138/45, 46

[56] References Cited

UNITED STATES PATENTS

| 2,771,878 | 11/1956 | Folland et al. | 128/214 R |
| 3,242,920 | 3/1966 | Andersen | 128/2.05 D |
| 3,216,419 | 11/1965 | Scislowicz | 128/214 C |
| 3,105,490 | 10/1963 | Schoenfeld | 222/25 |
| 2,842,123 | 7/1958 | Rundhaug | 128/214 F |
| 3,298,367 | 1/1967 | Bergman | 128/214 R |
| 1,617,614 | 2/1927 | York | 138/46 |
| 3,468,308 | 9/1969 | Bierman | 128/214 F |
| 2,090,273 | 8/1937 | Wagner | 138/390 |
| 3,042,038 | 7/1962 | Beacham | 128/214 C |

OTHER PUBLICATIONS

Lancet – April 6, 1963, pp. 754– 755,

Primary Examiner—Dalton L. Truluck
Attorney—Fritz B. Peterson

[57] ABSTRACT

An apparatus, intended to be mounted adjacent a patient, which supports an inspection chamber at a predetermined elevation with respect to the patient, the chamber being connected to the patient through an infusion supply tube. A container of intravenous infusion fluid supplies the fluid to the inspection chamber at a predetermined pressure, and at a selected rate, depending on the selection of one of several exit orifices and calculated to maintain the fluid at a predetermined level in the inspection chamber. Fluid level sensors give warning if the fluid level in the inspection tube rises or falls a preselected amount. In one embodiment, the fluid level in the container is maintained at a fixed level above the inspection chamber. In another embodiment, the infusion level is maintained under a predetermined pressure by a regulated pressure fluid.

10 Claims, 10 Drawing Figures

PATENTED SEP 12 1972

INVENTOR.
REYNOLDS G. GORSUCH
BY Lyon & Lyon
ATTORNEYS

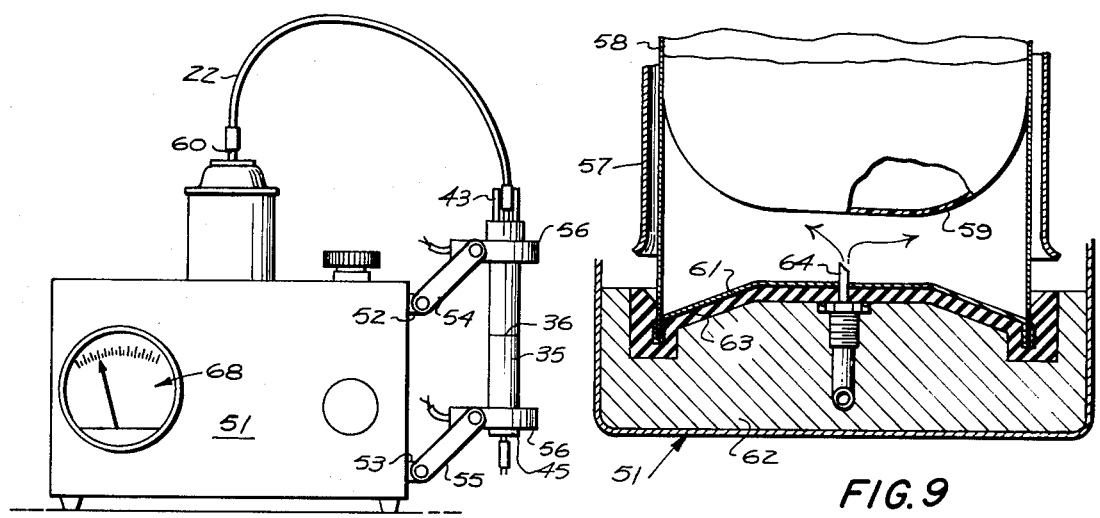
FIG. 7
FIG. 9
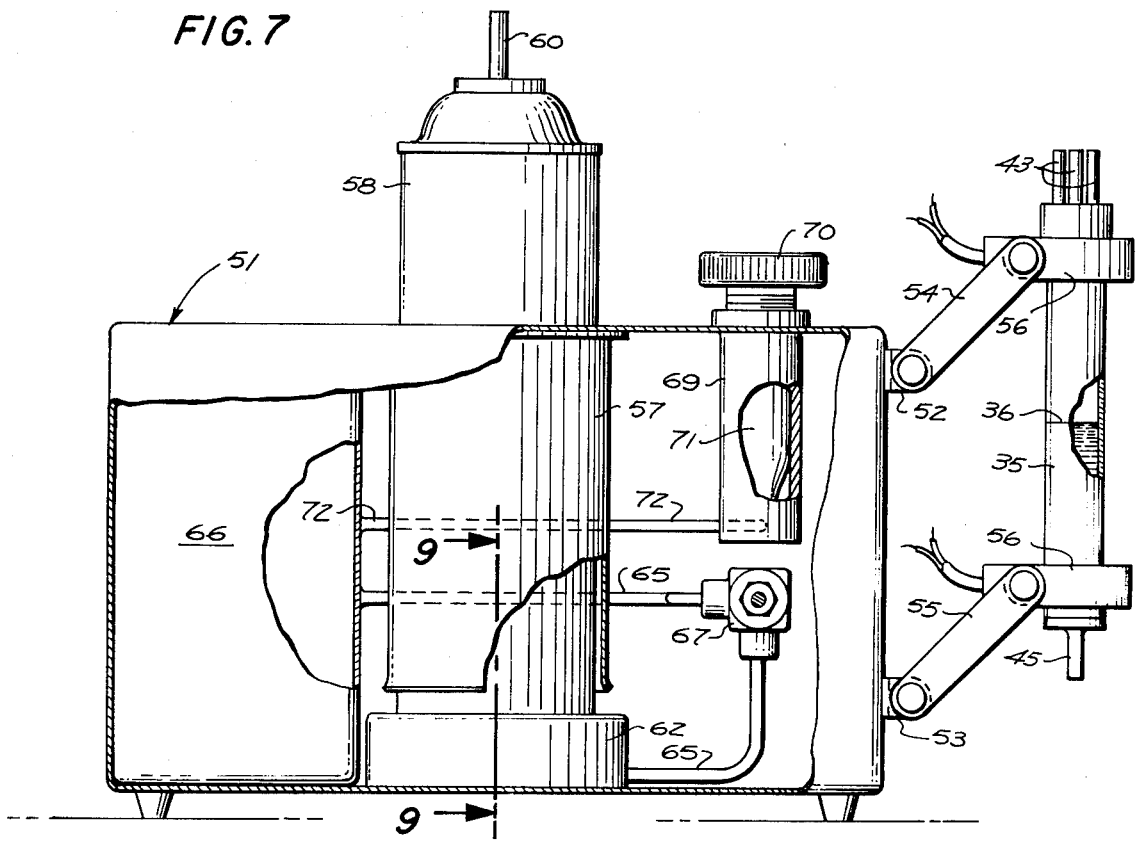
FIG. 8
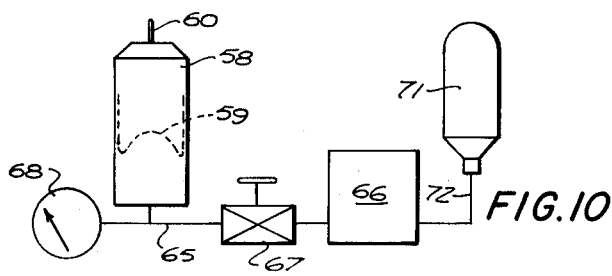
FIG. 10
INVENTOR.
REYNOLDS G. GORSUCH
BY
Lyon & Lyon
ATTORNEYS

APPARATUS FOR PARENTERAL FLUID INFUSION PROVIDED WITH VARIABLE FLOW CONTROL MEANS

BACKGROUND OF THE INVENTION

In the hospital care of patients, it is often necessary to feed the patient intravenously with solutions of sterile water and various compounds of salt, sugar, minerals and/or medications. This intravenous feeding adds to the volume of fluids in the vascular system assisting heart action, and nourishing the patient.

The present method of fluid infusion utilizes a vertical holding stand, a bottle of fluid and an administration tube set which consists of a disposable plastic tube having a transparent drip chamber, intermediate its ends, an occlusion wheel between the bottle and the drip chamber and a needle. In practice, the nurse fills the tube with the solution, inserts the needle into the patient's vein and plugs the other end of the tube into the bottle of fluid. She then hangs the bottle on the holding stand, observing the flow into the drip chamber. By counting the drops per minute, and adjusting the occlusion wheel, which clamps the tubing, the nurse is able to control the flow rate of the fluid into the patient.

Problems generally associated with this system are as follows:

1. Counting of drops per minute and the conversion of this to milliliters per hour requires a measurement, and a calculation which consumes nurse time.
2. Manipulation of the occlusion wheel is empirical by nature and requires several adjustments, thus consuming more time.
3. The setting can and will change as a function of the liquid level in the bottle and variables in the resistance to flow caused by changes in the patient's venous blood pressure or placement of the insertion needle.
4. Should the bottle go dry unobserved, it is possible to get air into the patient which is a dangerous condition to health.
5. Other conditions can occur unobserved, such as the needle coming out of the vein and lodging in the muscle causing edema, or coming out of the arm completely discharging the fluid exterior to the patient.

The most time-consuming condition, however, occurs when the flow rate setting changes, requiring that the nurse return to the patient, recount drops and reset the occlusion wheel.

SUMMARY OF THE INVENTION

The present invention is directed to an apparatus for fluid infusion or intravenous feeding which eliminates or minimizes the aforesaid problems, and the invention is summarized in the following objects:

First, to provide an apparatus to effect fluid infusion wherein the venous blood pressure is over-balanced a predetermined amount by a column of fluid in the supply tube in a manner simulating a U-tube manometer.

Second, to provide an apparatus, as indicated in the preceding object, which includes a novelly arranged vented inspection chamber for visual determination of the upper level of the column of fluid; the inspection chamber incorporating means for sensing and producing an alarm signal should the fluid level rise or fall a predetermined distance.

Third, to provide an apparatus, as indicated in the preceding objects, which incorporates a novelly arranged means for supplying fluid to the inspection chamber at a constant pressure; means for adjusting the pressure; and a scale calculated in terms of milliliters per hour, thereby eliminating the need to count the drops of fluid entering the inspection chamber and mathematically determining the rate of flow of fluid to the inspection chamber.

Fourth, to provide an apparatus, as indicated in the preceding object, wherein a set of metering orifices are provided at the entrance end of the inspection chamber, which may be selected to provide different ranges of fluid supply.

Fifth, to provide an apparatus to effect fluid infusion, one embodiment of which incorporates a novel means of supporting the fluid supply bottle above the inspection chamber in such a manner that the level of fluid in the bottle is maintained at a fixed height above the inspection chamber as the bottle is emptied.

Sixth, to provide an apparatus to effect fluid infusion, another embodiment of which incorporates a container for the fluid supply subject to a constant external pressure derived from a pressure cell through a pressure reducing valve.

DESCRIPTION OF THE DRAWINGS

FIG. 7 is a front view, illustrating another embodiment of the apparatus for fluid infusion.

FIG. 8 is an enlarged view, partially a front view, partially a sectional view of the embodiment depicted in FIG. 7.

FIG. 9 is a fragmentary transverse sectional view of structure, taken through 9—9 of FIG. 8.

FIG. 10 is a diagrammatical view, illustrating the pressurizing system for the infusion fluid container.

Figure 2:
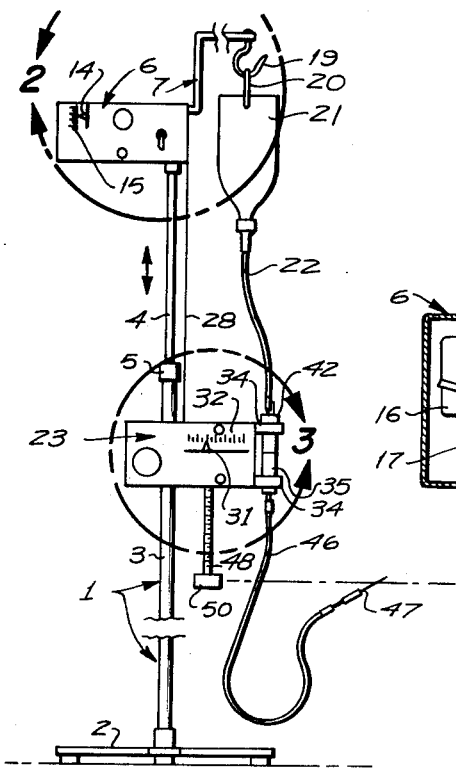
FIG. 2 is a front view, showing one embodiment of the apparatus for fluid infusion, with the supporting stand shown fragmentarily.
Figure 1:
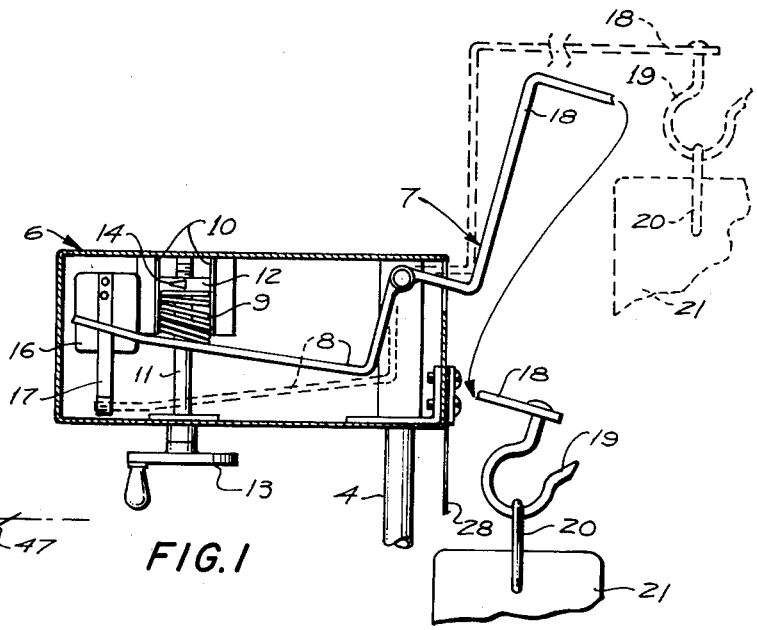
FIG. 1 is an enlarged partially sectional, partially front view, taken within Circle 2 of FIG. 2, showing the means for supporting the infusion fluid container, indicating by solid lines the condition when the container is full of fluid, and indicating by dotted lines the condition when the container is empty.
Figure 4:
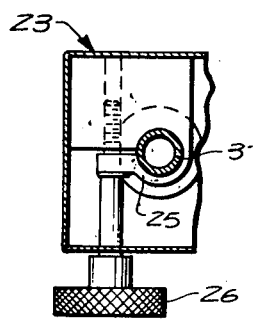
FIG. 4 is a fragmentary sectional view, taken through 4—4 of FIG. 3, showing the clamp means for positioning the readout housing.
Figure 3:
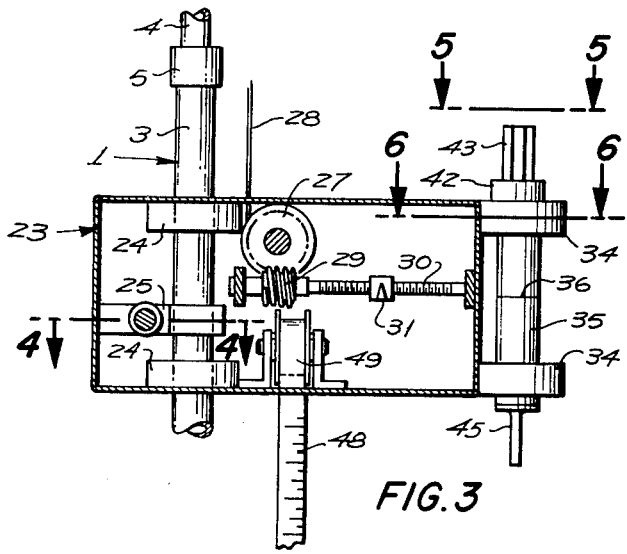
FIG. 3 is another enlarged fragmentary partially sectional and partially front view, taken within Circle 3 of FIG. 2, and showing the readout housing and inspection chamber.
Figure 5:
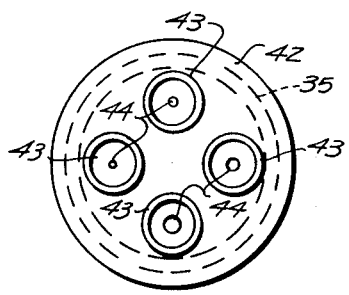
FIG. 5 is an enlarged end view of the inspection chamber, taken from 5—5 of FIG. 3, showing the inlet orifices to the inspection chamber.

Reference is first directed to the embodiment shown in FIGS. 1 through 6. This embodiment of the apparatus for fluid infusion includes a stand 1, having a base 2, a fixed tube 3 extending upwardly therefrom, which receives an adjustable tube 4. A conventional clamp ring 5 is provided at the upper end of the fixed tube so that the adjustable tube may be secured at any desired height.

Mounted at the upper end of the adjustable tube 4 is a counterbalance housing 6, which pivotally supports a counterbalance lever 7, having an internal arm 8 disposed within the housing and extending under a spring 9. The spring is mounted between guides 10 and surrounds a screw shaft 11, the upper end of which carries an abutment disk 12 restrained against rotation by the guides 10. The lower end of the shaft 11 protrudes from the bottom of the counterbalance housing and is provided with a hand wheel 13 which may be rotated to vary the force exerted by the spring 9 on the internal arm 8 of the counterbalance lever 7.

The abutment disk 12 carries a pointer 14 which protrudes from the counterbalance housing. Fixed to the counterbalance housing is a scale 15 cooperating with the pointer 14. Within the housing is a signal switch 16, including an actuating member 17 extending downwardly and arranged to be engaged by the end portion of the internal arm 8 when the internal arm is in the dotted line position shown in FIG. 1.

The counterbalance lever also includes an external arm 18, provided at its extremity with a hook 19 for the purpose of supporting by means of a suspension hook 20 an infusion fluid container 21. The container is a bottle supported in an inverted position and provided with a discharge tube 22 at its lower end. The counterbalance spring 9 is so adjusted that as the fluid is discharged from the container 21, the container rises in proportion to the fluid discharged so that the elevation of the surface of the liquid remains essentially constant.

Adjustably supported on the fixed tube 3 is a readout housing 23. The readout housing is provided with guides 24 and a clamp 25, having an external handle 26 so that the readout housing may be secured at any desired height.

Contained within the readout housing 23 is a drum or reel 27 which may be spring loaded and may be the type commonly employed in connection with retractable measuring tapes. Wrapped on the drum is a suspension tape 28 which extends upwardly and is attached to the counterbalance housing 6.

The drum or reel 27 is connected by a gear drive 29 to a screw shaft 30 on which rides a pointer 31 which cooperates with a readout scale 32 provided on the front side of the readout housing.

One end of the readout housing is provided with a pair of spaced horizontally extending mounting blocks 34 which support a tubular inspection chamber 35, having an index mark or line 36 at its midpoint. Each mounting block is provided with lateral openings 37 and 38 which communicate with the interior of the readout housing 23. At its side opposite from the lateral openings, each mounting block is provided with a mirror 39 confronting the inspection chamber 35. The lateral openings 37 and 38 converge toward the mirror. A light source 40 is provided within the readout housing 23 in alignment with the opening 37 and a photoelectric cell 41 is disposed in alignment with the other opening 38. Conventional electrical means is connected with the light source and photoelectric cell to detect the presence of a liquid surface in the region of the upper mounting block or lower mounting block.

The inspection chamber 35 is provided with an upper cap 42 which supports a set of inlet fittings 43. Any one of the inlet fittings is adapted to receive the lower end of the discharge tube 22. The discharge ends of the fittings are provided with a set of orifices 44 which differ in size so that the rate of flow from the discharge tube 22 may be changed depending upon the fitting and orifice selected. The unused fittings and their orifices expose the contents of the inspection chamber to atmospheric pressure. The readout scale 32 actually comprises a set of four readout scales corresponding to the four orifices 44.

The lower end of the inspection chamber 35 is provided with an outlet fitting 45 which is connected to a patient supply or infusion tube 46, having an infusion needle 47 at its lower end for insertion into the patient.

Suspended from the readout housing 23 is an elevation measuring tape 48 attached to a spring loaded reel 49 within the readout housing and provided at its lower end with a slighting tube 50.

Operation of the embodiment of the fluid infusion apparatus shown in FIGS. 1 through 6 is as follows:

The readout housing 23 is adjusted on the fixed tube 3 to place the index mark 36 of the inspection chamber 35 at the desired distance above the location of the heart of the patient. The sighting tube 50 may be used to locate the approximate position of the patient's heart and the measuring tape used to determine the height of the index mark 36.

The height of the counterbalance housing 6 above the readout housing 23 is adjusted, or more accurately, the height of the liquid in the container 21 is adjusted to place the pointer 31 at the desired location on the readout scale 32. The readout scale does not indicate directly this vertical distance but more usefully is calibrated in terms of milliliters per hour or other selected measurement of fluid flow. The rate of fluid flow is also dependent upon the orifice 44 which is selected. The orifice sizes are such that the four corresponding scales are in vertical alignment and it is merely necessary to read the proper scale to determine the rate of flow to a corresponding orifice.

After the apparatus is prepared for use, which includes filling the infushion tube 46 and inspection chamber 35 to the index mark 36, the needle is inserted in the patient. Further adjustment of the height of the counterbalance housing 6 may be made so that the rate of flow of infusion fluid to the inspection chamber corresponds to the rate of flow therefrom into the patient, and the liquid level in the inspection tube remains constant.

Normally the rate of flow into the patient will remain constant so that the apparatus does not require further attention. However, should the flow of fluid into the patient change, the liquid level in the inspection chamber will either rise or fall until one or the other of the level sensing means in the mounting blocks operates an alarm. This alarm may be an audible or visual alarm contained in or supported by the readout housing and may in addition be connected to an alarm located at a remote station.

The conditions which might cause change in the liquid level within the inspection chamber include dislodgement of the needle, permitting free flow from the infusion tube and causing the liquid level to drop; or, the needle may be displaced in such a manner as to penetrate into muscle tissue which offers greater resistance and causes the liquid level to rise.

In the operation of the infusion apparatus, it is essential that the inspection chamber, that is the upper end thereof, be exposed to atmosphere so that the pressure applied to the surface of the liquid therein is atmospheric pressure. In effect, the infusion tube and the liquid filled portion of the inspection chamber might be likened to one side of a U-tube manometer, the other side being the back pressure existing in the venous system of the patient.

Figure 6:
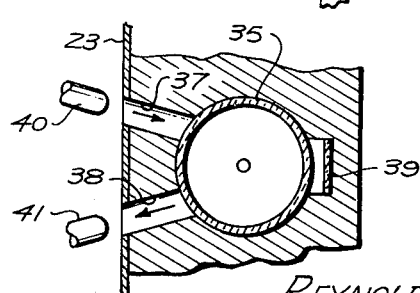
FIG. 6 is an enlarged fragmentary sectional view, taken through 6—6 of FIG. 3, showing the upper liquid level detector.

Reference is now directed to FIGS. 7 through 10. A housing 51 is provided, at one end of which is provided an upper pair of brackets 52 and a lower pair of brackets 53. These are connected by pairs of links 54 and 55 to mounting blocks 56, corresponding to the mounting blocks 34. The mounting blocks 56 contain the lateral openings 37 and 38 and the index mark 36, as shown in FIG. 6 of the first described structure; however, they are arranged to also include the light source 40 and photo cell 41, inasmuch as the mounting blocks 56 are spaced from the housing 51. As in the first described structure, the mounting blocks 56 support an inspection chamber 35 having the upper set of inlet fittings 43 and outlet fitting 45.

Fitted within the housing 51 is a tubular guide 57, open at its ends with the upper end secured in the upper wall of the housing 51 and forming an opening into which a cylindrical metal container 58 may be inserted. The container receives a plastic bag 59 which is collapsible and which receives the infusion fluid. The upper end of the container is provided with an outlet tube 60 for connection to a discharge tube 22, adapted for connection to one of the inlet fittings 43.

The container is provided with a bottom end 61 which when the container is inserted in the tubular guide 57 rests on a supporting block 62 located within the bottom side of the housing 51. The upper side of the supporting block 62 is shaped into conformity with the bottom end 61 and is provided with a sealing liner 63. The supporting block 62 is provided with a piercing tube 64 which penetrates the bottom end 61 when the container is forced against the supporting block.

In place of the sealing liner 63, the sealing means may be incorporated in the bottom end 61 of the container as more fully illustrated in U.S. Pat. No. 3,393,842, issued July 23, 1969, which patent illustrates a container capable of being pressurized and provided with a collapsible liner. However, if a container similar to that described in the above patent is used, it is essential that the contents of the collapsible bag be capable of continuous discharge into the discharge tube 22, rather than employ the valve means illustrated in the patent.

The piercing tube 64 communicates with a supply line 65 extending from a pressure reducing chamber 66. Interposed in the supply line 65 is a regulator valve 67 and a readout gauge 68 which includes a pointer and gauge exposed at one side of the housing 51.

Set within the upper end of the housing 51 is a capsule receiving sleeve 69, having a screw cap 70 and dimensioned to receive a capsule 71 containing high pressure gas such as carbon dioxide. A typical capsule suitable for this purpose is the type used to produce soda water; that is, such capsules are conventional and have a penetrable seal capable of being pierced by a tubular needle, such needle, not shown, being provided in the bottom end of the sleeve 69. The fluid issuing from the capsule 71 is delivered to the pressure reducing chamber 66 by a pressure line 72.

Operation of the embodiment shown in FIGS. 7 through 10 is as follows:

As in the first described structure, the inspection chamber 35 is placed at the desired height above the level of the heart of the patient or other reference point and is capable of limited vertical adjustment by reason of the links 54 and 55.

A container 58 is inserted in the guide 57 until its bottom end is pierced by the tubular needle 64, as indicated in FIG. 9. Similarly, the capsule 71 is inserted in the sleeve 69 and pierced so that its contents may flow through the line 72 to the pressure reducing chamber 66. The regulator valve 67 is then opened and adjusted until the gauge indicates the desired rate of flow. In this connection, it should be noted that the gauge 68 is provided with a set of four scales corresponding to the set of four orifices communicating with the inspection chamber. These scales are calibrated in terms of rate of flow such as liters per hour.

It will thus be seen that the embodiment shown in FIGS. 7 through 10 functions in much the same manner as the first described structure except that the rate of flow into the inspection chamber is determined by the pressure applied against the collapsible bag 59 rather than the height at which the bag or container is disposed above the inspection chamber.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. An apparatus for fluid infusion of a patient, comprising:
   a. an inspection chamber vented at its upper end to maintain atmospheric pressure therein;
   b. means for supporting the inspection chamber at a predetermined height above a patient;
   c. an infusion tube for connecting the inspection chamber with the patient;
   d. means for supplying infusion fluid to the inspection chamber at a constant pressure; and
   e. a set of orifices of different size at the upper end of the inspection chamber for selective connection to the infusion fluid supply means to change the rate of flow of infusion fluid into the inspection chamber, at least one of the unused orifices constituting the vent for maintaining atmospheric pressure in the inspection chamber.

2. An apparatus, as defined in claim 1, which further comprises:
   a. means for indicating rise or fall of infusion fluid in the inspection chamber.

3. An apparatus, as defined in claim 1, wherein the means for supplying infusion fluid to the inspection chamber comprises:
   a. a container for infusion fluid;

b. means for supporting the container above the inspection chamber, including means for counterbalancing the container and its contents to maintain the fluid level in the container at a constant height above the inspection chamber.

4. An apparatus for fluid infusion of a patient, comprising:
   a. an inspection chamber vented at its upper end to maintain atmospheric pressure therein, said chamber having plural means thereon to selectively vary the rate of flow therethrough;
   b. adjustable means supporting the inspection chamber at a predetermined height above a patient;
   c. an infusion tube connected to the inspection chamber for connecting the inspection chamber with the patient;
   d. means for supplying infusion fluid to the inspection chamber at a constant pressure including
      i. a collapsible bag capable of being connected with the inspection chamber for receiving the infusion fluid;
      ii. a pressure chamber surrounding the bag;
      iii. means for piercing the pressure chamber to provide a fluid pressure inlet to the pressure chamber for pressurizing the bag;
      iv. and means for supplying a fluid at a predetermined pressure to the pressure chamber to cause collapse of the bag.

5. An apparatus for supplying infusion fluid to a patient, comprising:
   a. a supporting stand;
   b. an inspection chamber vented to atmosphere;
   c. a first mounting means for adjustably supporting the inspection chamber on the stand thereby to position the inspection chamber at a predetermined height above the patient;
   d. an infusion tube connecting the inspection chamber with the patient;
   e. a second mounting means adjustably supported on the stand at a predetermined height above the first mounting means;
   f. a lever pivotally carried by the second mounting means;
   g. an infusion fluid container supported by the lever and connected to the inspection chamber for flow of infusion fluid thereto;
   h. a counterbalance for applying an opposing force to the lever for tending to maintain the infusion fluid in the container at a constant level, thereby to maintain flow of the infusion fluid to the inspection chamber at a constant pressure;
   i. means extending between the first and second mounting means for adjusting the distance between a reference level at the inspection chamber and the level of infusion fluid in the container;
   j. and pointer and scale means for indicating the rate of flow of infusion fluid to the inspection chamber corresponding to the height of the infusion fluid in the container.

6. An apparatus, as defined in claim 5, which further comprises:
   a. a first means for sensing rise of infusion fluid in the inspection chamber to an upper level;
   b. and a second means for sensing fall of infusion fluid in the inspection chamber to a lower level.

7. An apparatus for supplying infusion fluid to a patient, comprising:
   a. a supporting stand;
   b. an inspection chamber vented to atmosphere;
   c. a first mounting means for adjustably supporting the inspection chamber on the stand thereby to position the inspection chamber at a predetermined height above the patient;
   d. an infusion tube connecting the inspection chamber with the patient;
   e. a second mounting means adjustably supported on the stand at a predetermined height above the first mounting means;
   f. a lever pivotally carried by the second mounting means;
   g. an infusion fluid container supported by the lever and connected to the inspection chamber for flow of infusion fluid thereto;
   h. a counterbalance for applying an opposing force to the lever for tending to maintain the infusion fluid in the container at a constant level, thereby to maintain flow of the infusion fluid to the inspection chamber at a constant pressure; and
   i. a set of orifices of different size at the upper end of the inspection chamber for selective connection to the infusion fluid container to permit flow into the inspection chamber at different flow rates.

8. An apparatus for supplying infusion fluid to a patient, comprising:
   a. a housing adapted to be placed adjacent a patient at an elevated level;
   b. a vented inspection chamber adjustably mounted at one side of the housing for positioning at a predetermined level above the patient;
   c. a collapsible bag intended to receive infusion fluid and tube connected to the inspection chamber;
   d. a rigid container for receiving the bag and forming therewith a chamber adapted to receive a gas for collapsing the bag to discharge its contents;
   e. said housing including a recess to receive the container; means at the bottom of the recess for piercing the container; a gas supply line communicating with said means; and means connected with the supply line for receiving a cartridge containing gas under pressure; and a pressure reducing chamber and regulating valve interposed in the supply line for supplying gas to the container at a predetermined pressure.

9. An apparatus, as defined in claim 8, which further comprises:
   a. infusion fluid level sensing means adjacent opposite ends of the inspection chamber for sensing maximum and minimum infusion level in the inspection chamber.

10. An apparatus, as defined in claim 8, which further comprises:
   a. a set of orifices of different size at the upper end of the inspection chamber for selective connection to the infusion fluid bag to permit flow into the inspection chamber at different flow rates.

* * * * *